(12) United States Patent
Lee et al.

(10) Patent No.: US 10,319,967 B2
(45) Date of Patent: Jun. 11, 2019

(54) BATTERY MODULE

(71) Applicant: Samsung SDI Co., Ltd., Yongin-si, Gyeonggi-do (KR)

(72) Inventors: Daepyo Lee, Yongin-si (KR); Kwanil Oh, Yongin-si (KR); Heuisang Yoon, Yongin-si (KR); Woonseong Baek, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 126 days.

(21) Appl. No.: 15/277,548

(22) Filed: Sep. 27, 2016

(65) Prior Publication Data

US 2017/0104196 A1    Apr. 13, 2017

(30) Foreign Application Priority Data

Oct. 8, 2015    (KR) .................. 10-2015-0141633

(51) Int. Cl.
*H01M 2/10*    (2006.01)
*H01M 2/20*    (2006.01)
*H01M 10/42*    (2006.01)

(52) U.S. Cl.
CPC ......... *H01M 2/1077* (2013.01); *H01M 2/206* (2013.01); *H01M 2220/20* (2013.01)

(58) Field of Classification Search
CPC ........ H01M 2/10; H01M 2/1077; H01M 2/20; H01M 2/206; H01M 2/1066; H01M 2/204; H01M 10/42; H01M 10/425
See application file for complete search history.

(56) References Cited

U.S. PATENT DOCUMENTS

| | | | |
|---|---|---|---|
| 9,159,968 B2 | 10/2015 | Park et al. | |
| 2007/0141458 A1* | 6/2007 | Nagatani | H01M 2/204 429/158 |
| 2010/0266889 A1 | 10/2010 | Kim | |
| 2012/0115014 A1* | 5/2012 | Park | H01M 2/206 429/159 |

FOREIGN PATENT DOCUMENTS

| | | |
|---|---|---|
| JP | 2010-033913 A | 2/2010 |
| KR | 2008-0013040 A | 2/2008 |
| KR | 2010-0114595 A | 10/2010 |
| KR | 2014-0008123 A | 1/2014 |

* cited by examiner

*Primary Examiner* — Karie O'Neill Apicella
(74) *Attorney, Agent, or Firm* — Knobbe, Martens, Olson & Bear, LLP

(57) ABSTRACT

A battery module includes a bus bar; and a plurality of battery packs electrically connected to each other by the bus bar and arranged in front and rear directions, wherein each of the plurality of battery packs comprises a front polarity display part and a rear polarity display part that display polarities of terminals in front and rear positions of the terminals, wherein the front polarity display part and the rear polarity display part are formed to have different heights.

13 Claims, 8 Drawing Sheets

BATTERY MODULE

RELATED APPLICATIONS

This application claims the benefit of Korean Patent Application No. 10-2015-0141633, filed on Oct. 8, 2015, in the Korean Intellectual Property Office, the disclosure of which is incorporated herein in its entirety by reference.

BACKGROUND

Field

One or more exemplary embodiments relate to a battery module.

Description of the Related Art

In general, a secondary battery is rechargeable and dischargeable unlike a primary battery, which is not rechargeable. The secondary battery is used as an energy source of mobile devices, electric vehicles, hybrid vehicles, electric bicycles, uninterruptible power supplies, and the like, and depending on a type of an external device using the secondary battery, the secondary battery may be a single battery or a battery module obtained by grouping a plurality of secondary batteries.

Although a small mobile device such as a mobile phone may operate using an output and capacity of a single battery during a predetermined time period, a battery pack is preferably used in an electric vehicle, a hybrid vehicle, or the like that require a great amount of power and are driven over a long time period due to an output and capacity issue, and an output voltage or an output current supplied by the battery pack may increase according to the number of embedded battery cells.

SUMMARY OF CERTAIN INVENTIVE ASPECTS

One or more exemplary embodiments include a battery module in which polarities of a plurality of battery packs are arranged in a correct orientation and that includes a polarity arrangement mechanism capable of easily detecting a polarity confusion in a structure in which the plurality of battery packs are electrically connected.

One or more exemplary embodiments include a battery module including a guide for an assembly position of a bus bar in a structure in which a plurality of battery packs are bound together by using the bus bar, thereby facilitating binding the battery packs together and preventing faulty binding Additional aspects will be set forth in part in the description which follows and, in part, will be apparent from the description, or may be learned by practice of the presented embodiments.

According to one or more exemplary embodiments, a battery module includes: a bus bar; and a plurality of battery packs electrically connected to each other by the bus bar and arranged in front and rear directions, wherein each of the plurality of battery packs includes a front polarity display part and a rear polarity display part that display polarities of terminals in front and rear positions of the terminals, wherein the front polarity display part and the rear polarity display part are formed to have different heights.

The plurality of battery packs may include a front case and a rear case that are coupled to face each other, the front polarity display part is integrally formed on the front case, and the rear polarity display part is integrally formed on the rear case.

The bus bar may connect a front battery pack and a rear battery pack together, detour the rear polarity display part of the front battery pack, and cross the front polarity display part of the rear battery pack.

A height of the rear polarity display part may be greater than that of the front polarity display part.

The bus bar may include: a pair of coupling pieces coupled to terminals of different battery packs arranged in the front and rear directions; and a connection piece formed between the pair of coupling pieces.

Among the pair of coupling pieces, a coupling piece of one end and a coupling piece of the other end may be formed to have different heights.

The coupling pieces may be laid flat with respect to an upper surface of the battery pack, and the connection piece may stand upright vertically with respect to the upper surface of the battery pack.

The plurality of battery packs may be arranged in the front and rear directions in the same orientation and same polarities of the plurality of battery packs are connected to each other in parallel.

The terminals may include a + terminal and a − terminal of different polarities, and the front polarity display part and the rear polarity display part are respectively formed in front and rear of the + terminal and the − terminal.

The plurality of battery packs may include a front case and a rear case that are coupled to face each other, and guides for guiding an assembly position of the bus bar are formed in a terminal periphery of the front case and the rear case.

The guides may be integrally formed on the front case and the rear case.

The guides may be formed in front and rear directions or left and right directions perpendicular to the front and rear directions.

The bus bar may be guided by the guides and connects adjacent battery packs along a bent pattern.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Figure 1:
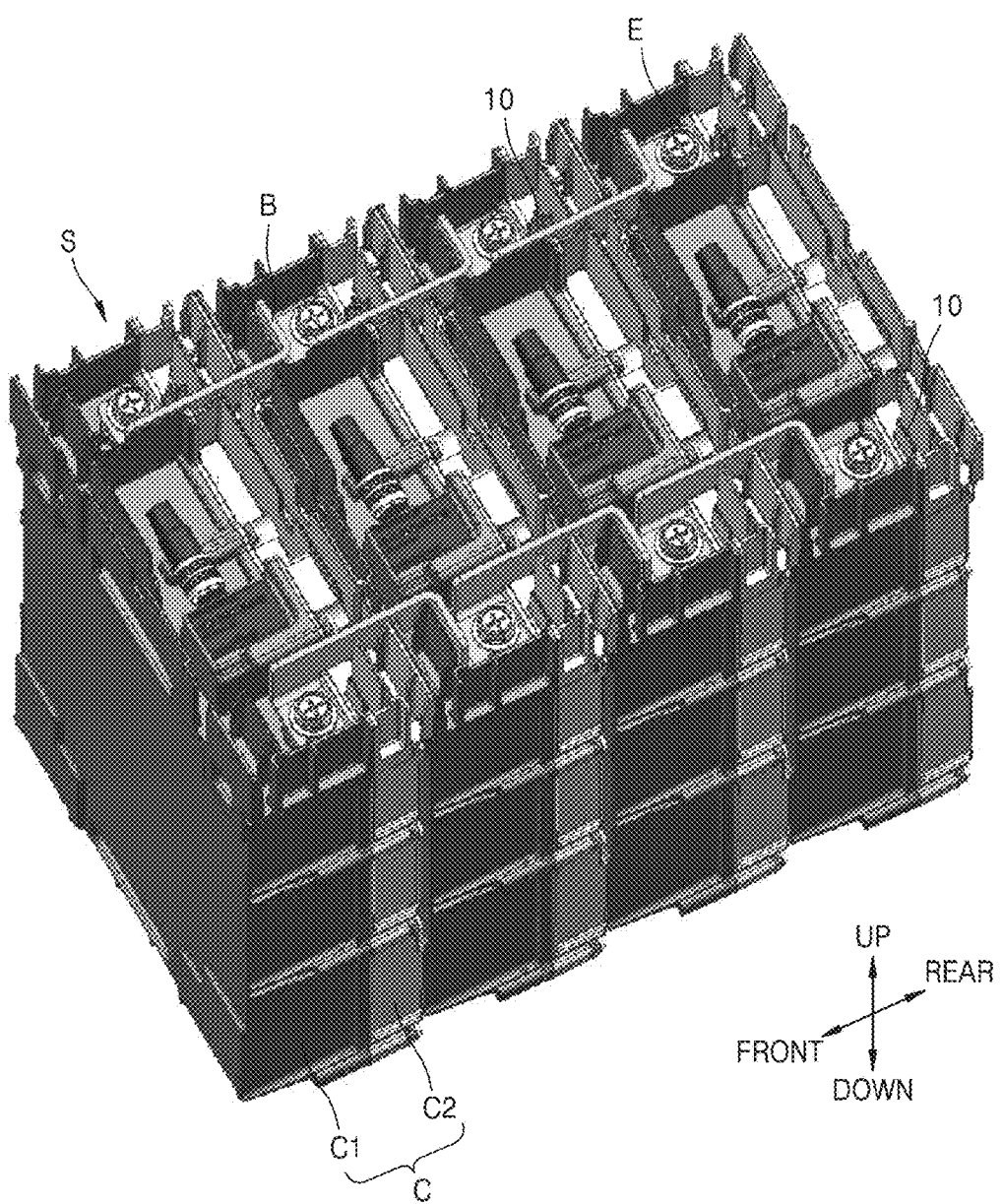
FIGS. 1 and 2 illustrate a battery module according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Hereinafter, a battery module according to an exemplary embodiment will be described with reference to the accompanying drawings.

Figure 2:
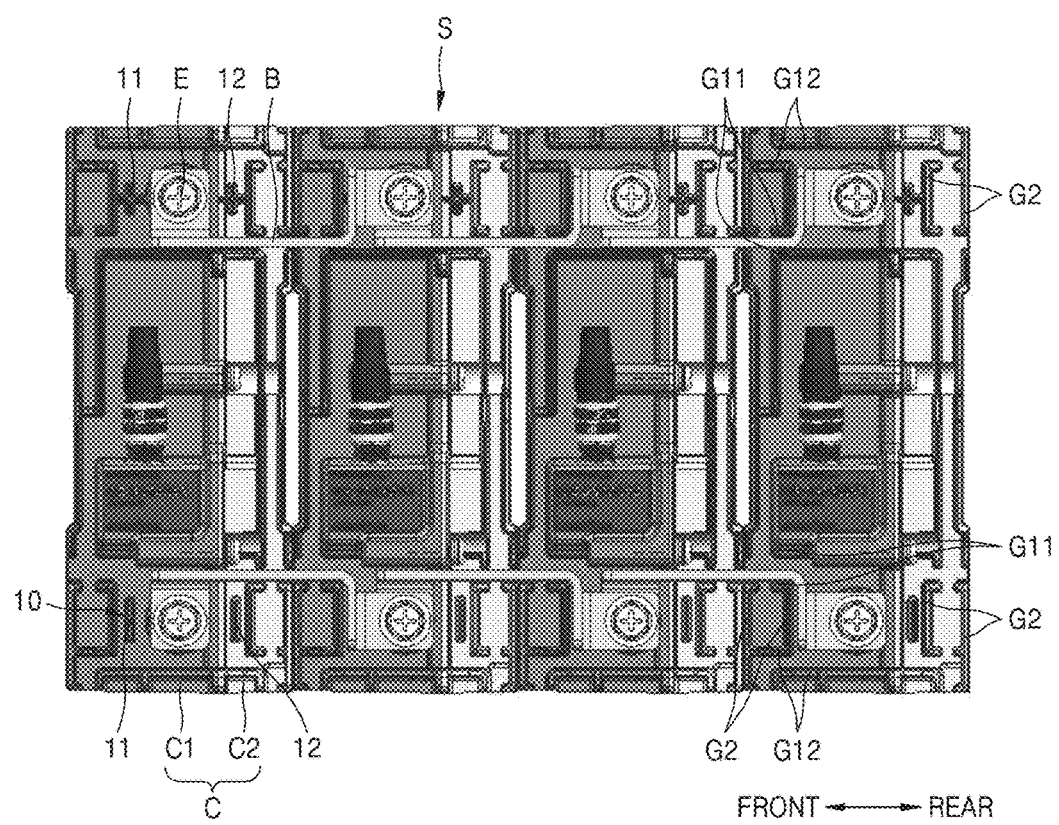
Figure 3:
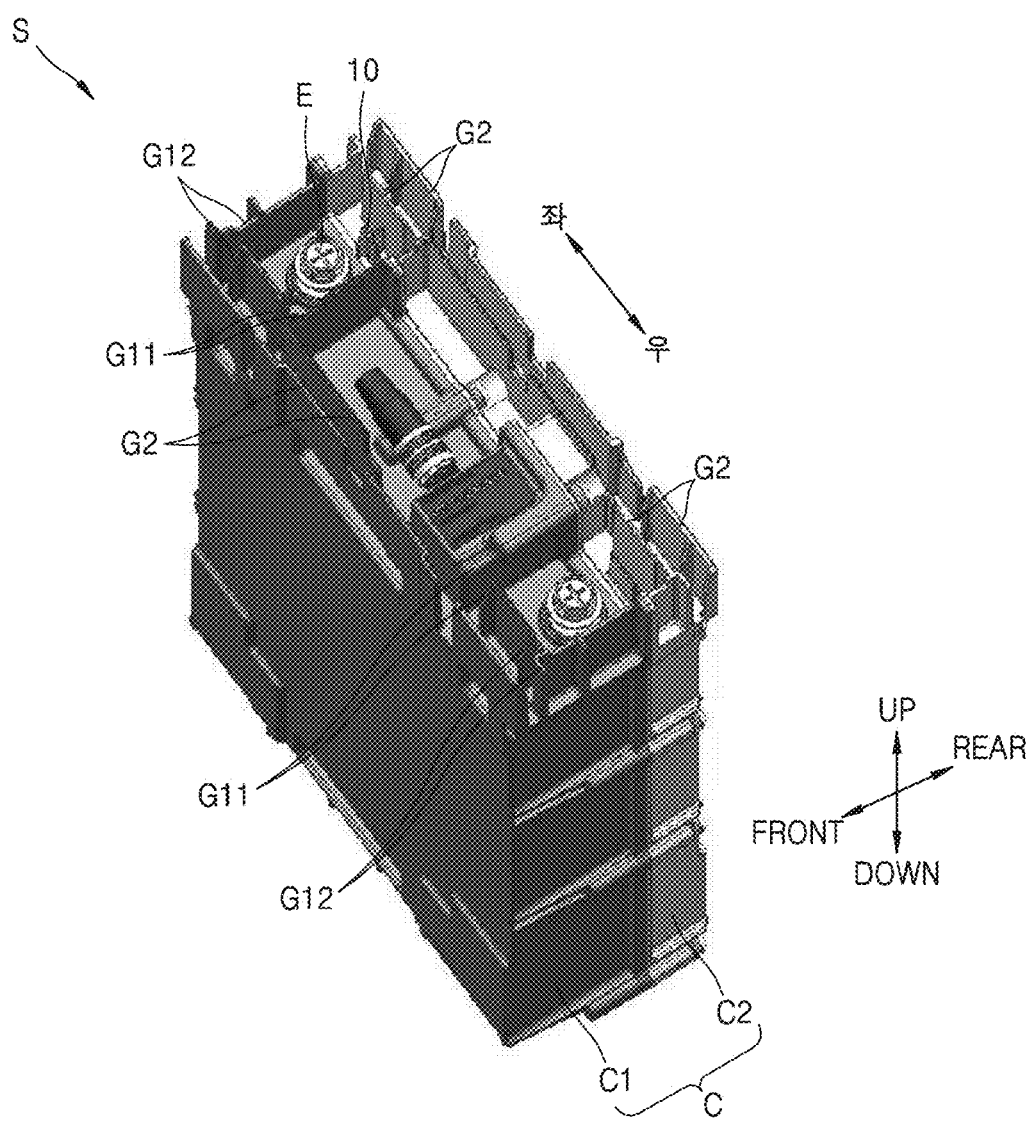
FIG. 3 is a perspective view of battery packs of FIG. 1.
Figure 4:
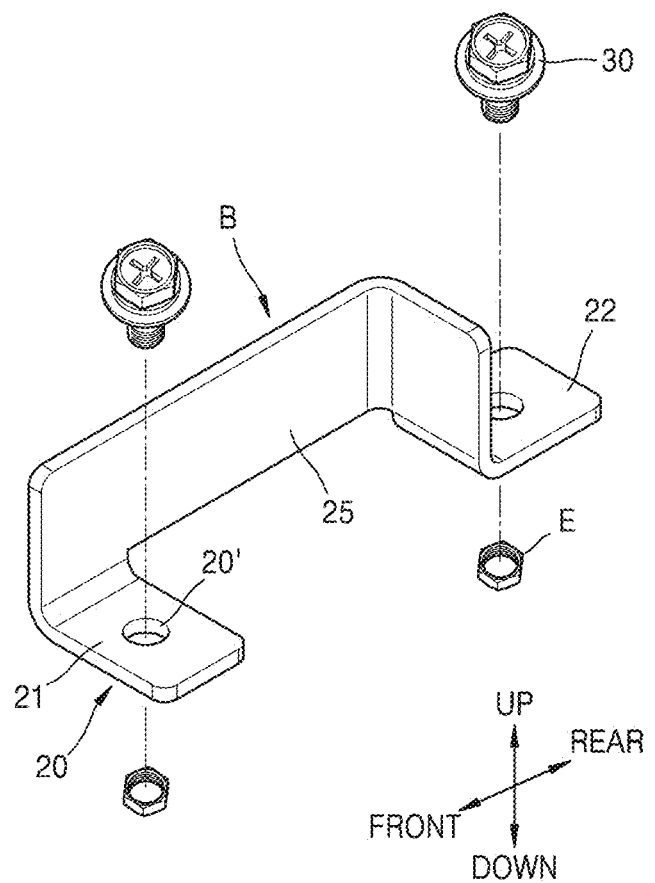
FIGS. 4 and 5 illustrate a structure of a bus bar of FIG. 1.
Figure 5:
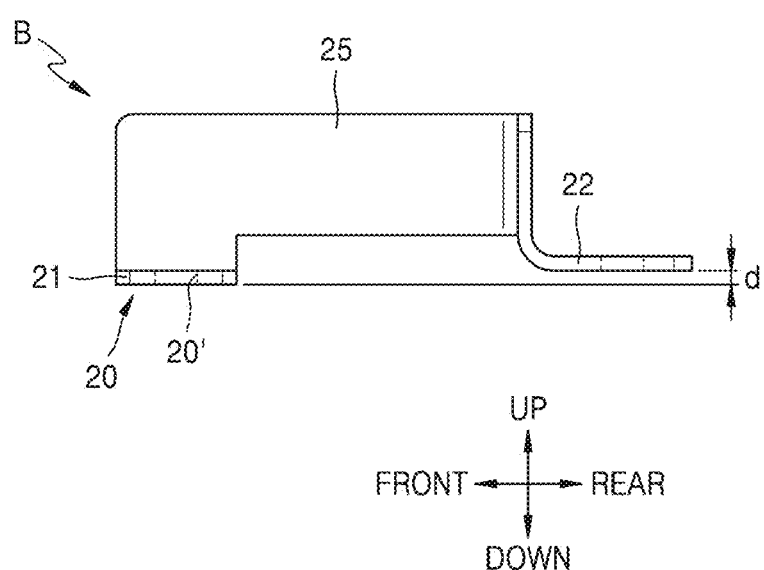
Figure 6:
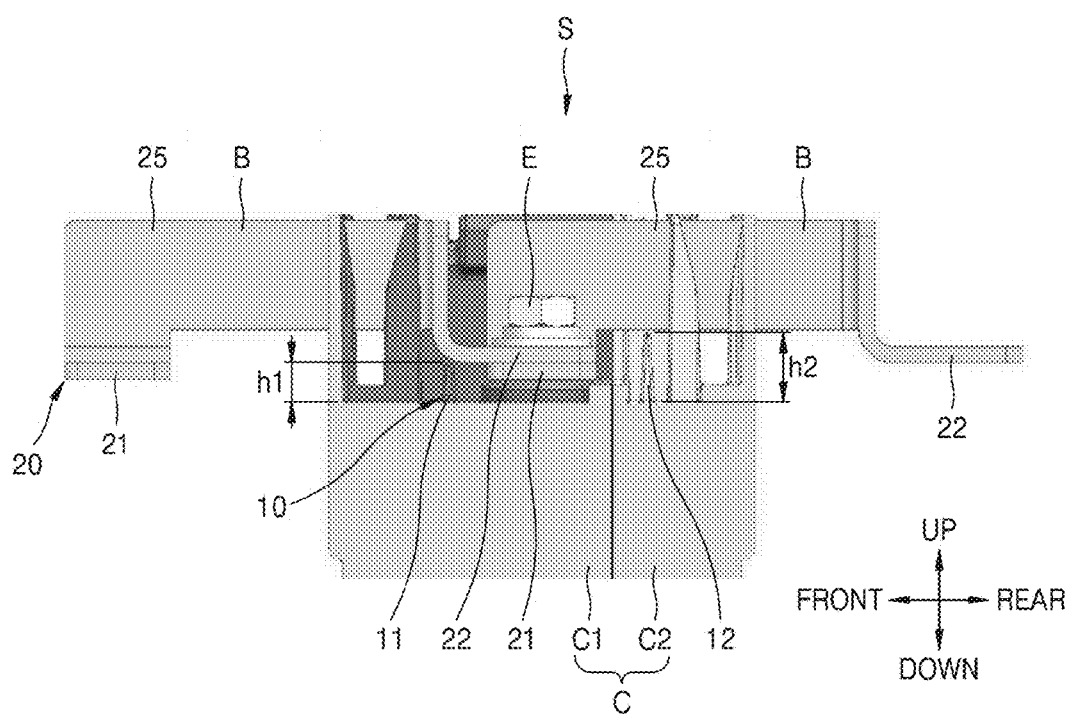
FIG. 6 illustrates a connection structure of the battery packs of FIG. 1.
Figure 7:
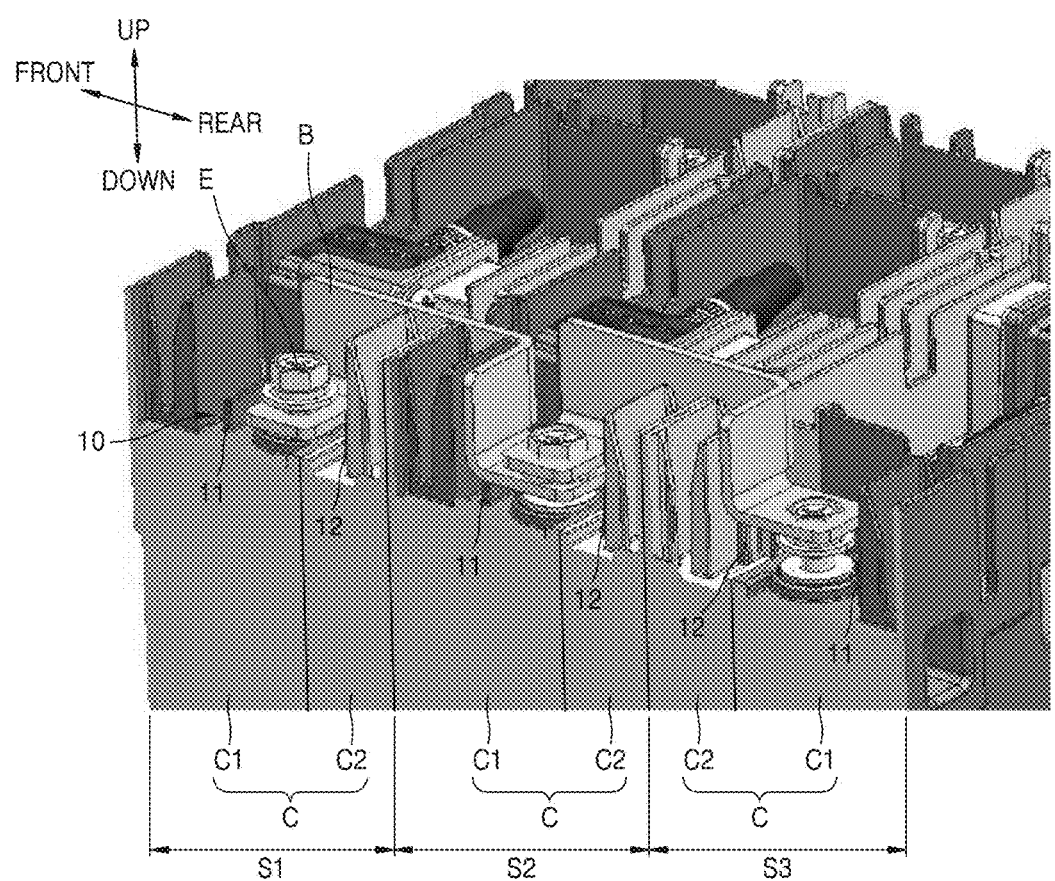
FIGS. 7 and 8 are views for describing a polarity arrangement structure of the battery module of FIG. 1.
Figure 8:
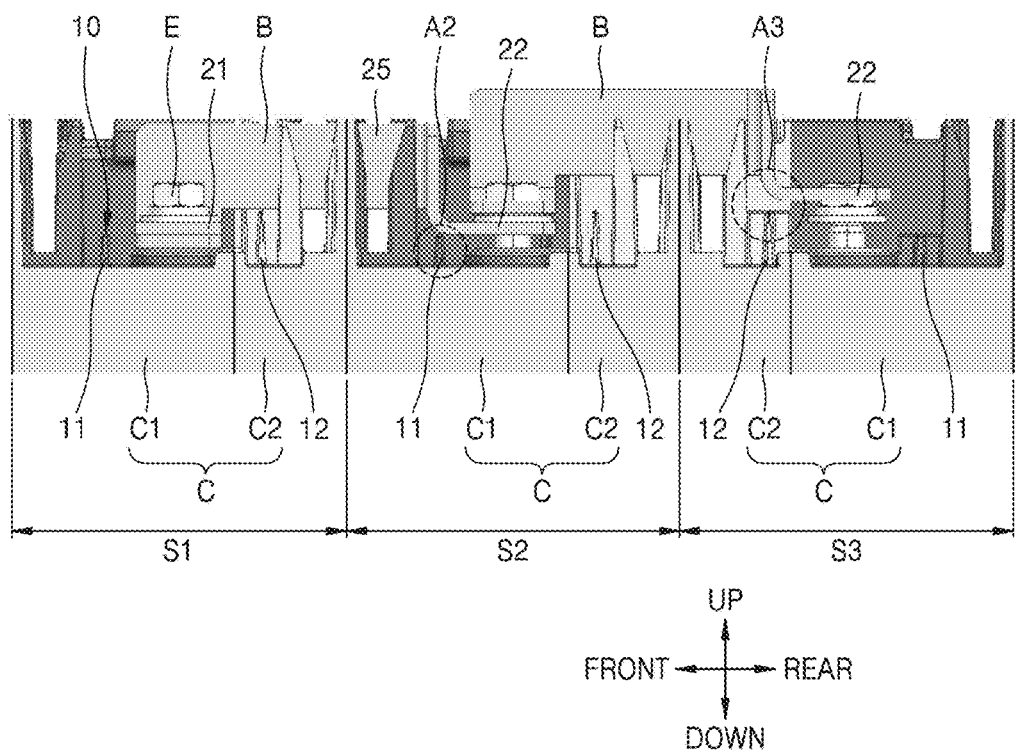

FIGS. 1 and 2 illustrate a battery module according to an exemplary embodiment. FIG. 3 is a perspective view of battery packs S of FIG. 1. FIGS. 4 and 5 illustrate a structure of a bus bar B of FIG. 1. FIG. 6 illustrates a connection structure of the battery packs S of FIG. 1. FIGS. 7 and 8 are views for describing a polarity arrangement structure of the battery module of FIG. 1.

Referring to FIGS. 1 through 8, the battery module may include the plurality of battery packs S. Although not shown, the battery module may further include a master pack (not shown) connected to the battery packs S and configured to control recharging and discharging operations of the battery packs S.

The battery packs S may be arranged in front and rear directions. For reference, in the present specification, the front and rear directions may correspond to an arrangement direction of the battery packs S. The battery packs S may be electrically connected to each other in series, in parallel, or by a combination of serial and parallel connections.

In an exemplary embodiment, the battery module may include 4 battery packs S electrically connected to each other, and the master pack (not shown) for controlling recharging and discharging operations of the battery packs S. However, the technical scope of the inventive concept is not limited to the above-described number of battery packs S. The number of battery packs S may be increased according to required electrical output capability. In more detail, according to the present exemplary embodiment, as the number of battery packs S is increased, the battery module may be extended for use as a high output. For example, the battery module may be extended such that the battery packs S are connected together using the battery pack S as one unit.

According to the present exemplary embodiment, as the battery packs S having substantially the same structure are connected to each other, output performance may be multiplied. In this regard, as the battery packs S have substantially the same structure, the battery module may be flexible in responding to various output demands. For example, for a use requiring a relatively low output, a relatively small number of battery packs S may be connected to each other to supply a battery module having a low output. For a use requiring a relatively high output, a relatively large number of battery packs S may be connected to each other to supply a battery module having a high output. Various output demands may be actively coped with like this, and manufacturing efficiency may also be increased through the battery packs S having substantially the same structure. Further, overlapping investment in design, manufacturing facilities, and the like for the battery packs S having different structures according to output demands may be prevented.

According to the present exemplary embodiment, the battery packs S may have substantially the same structure. In this regard, the battery packs S having substantially the same structure may be understood as battery packs S each having completely the same shape, and further, as battery packs S each not having completely the same shape but having largely the same structure. For example, although each of the battery packs S may have differences in some parts including a coupling portion, the same design may be largely applied to each of the battery pack S. In an exemplary embodiment, the same design may be applied to every portion of each of the battery packs S.

Each of the battery packs S may include a plurality of battery cells (not shown), and a case C where the battery cells are held and a terminal E as an exposed input-output port.

The case C of the battery packs S may include a front case C1 and a rear case C2 according to the front and rear directions in which the battery packs S are arranged. The front case C1 and the rear case C2 may be coupled in a direction in which the front case C1 and the rear case C2 face each other with at least one battery cell (not shown) interposed between the front case C1 and the rear case C2.

Each of the battery packs S may include the same number of battery cells (not shown), and may have substantially the same structure and shape. The terminal E may include a + terminal and a − terminal having different polarities from each other.

The battery module may include the bus bar B electrically connecting the battery packs S different from each other. For example, the bus bar B may electrically connect the battery packs S neighboring each other by connecting the terminals E of the battery packs S neighboring each other. For example, the bus bar B may connect the battery packs S neighboring each other in parallel by electrically interconnecting the terminals E of identical polarities of the battery packs S neighboring each other, and may connect the battery packs S neighboring each other in series by electrically interconnecting the terminals E of different polarities of the battery packs S neighboring each other. Serial or parallel connections of the battery packs S by using the bus bar B will be described in detail later.

Referring to FIGS. 4 and 5, the bus bar B may be in the form of a metal plate. For example, in a comparative example of the present exemplary embodiment, the battery packs S different from each other may be connected by using a flexible wire. In the case that the battery packs S are connected by using a wire, a thickness of the wire needs to be increased in order to withstand recharging or discharging current of a high voltage. Accordingly, assembling convenience may decrease, and it may be difficult to standardize a form of the wire for increasing capacity. Also, the flexible wire requires an extra component for fixing its assembly position.

In the present exemplary embodiment, the bus bar B in the form of a metal plate may be used, thereby decreasing resistance in recharging or discharging paths and facilitating standardizing a form of the bus bar B. Also, an extra component for extra fixation is not required, and the battery packs S may be fixed to each other sufficiently by coupling the terminals E of the battery packs S neighboring each other.

The bus bar B may include coupling pieces 20 positioned at both ends thereof and configured to be coupled to the terminals E of the battery packs S neighboring each other, and a connection piece 25 forming recharging or discharging paths between the coupling pieces 20. The coupling pieces 20 and the connection piece 25 may be disposed in different manners. The coupling piece 25 may be coupled to the battery packs S by engagement members 30 to be engaged with the terminals E of the battery packs S while being inserted in the terminals E of the battery packs S. For example, the engagement members 30 may be screw members to be engaged with the screw members formed in the upper portions of the terminals E of the battery packs S. Terminal holes 20', in which the engagement members 30 are configured to be inserted, may be formed in the coupling pieces 20.

The coupling pieces 20 and the connection piece 25 may disposed in different manners. For example, while the coupling pieces 20 are laid flat on the battery packs S, the connection piece 25 stands upright on the battery packs S. In detail, the coupling pieces 20 and the connection piece 25 are coupled to each other in different manners. When the coupling pieces 20 are laid flat, the connection piece 25 stands upright.

The coupling pieces 20 may be tightly in contact with the terminals E of the battery packs S and the engagement members 30 between the terminals E of the battery packs S and the engagement members 30. To this end, the coupling pieces 20 are laid flat on the battery packs S. Since the coupling pieces 20 form recharging or discharging paths connected to the terminals E of the battery packs S, coupling solidity between the coupling pieces 20 and the terminals E of the battery packs S affects electrical properties of the recharging or discharging paths, that is, electric resistance characteristics. Accordingly, the coupling pieces 20 and the terminals E of the battery packs S may be coupled to each other as firmly as possible while being in close contact with each other.

The connection piece 25 connects the coupling pieces 20 at both ends of the bus bar B and forms recharging or discharging paths between the terminals E of the battery packs S neighboring each other. In this regard, the connection piece 25 forms a connection path connecting the battery packs S neighboring each other. The connection piece 25 may have a smallest possible width in order to avoid physical interference in a connection route and maintain an electrical insulation state while connecting the battery packs S. Accordingly, the connection piece 25 may be disposed to stand upright on the battery packs S.

Although not shown, the bus bar B may have various forms. For example, the bus bar B may be provided in various forms according to positions and connection methods, such as serial connection and parallel connection, of the battery packs S to be connected by the bus bar B. However, in the present exemplary embodiment, the bus bar B may be provided in several standardized forms, the battery packs S may have various forms according to required output capacity.

The coupling pieces 20 may include a coupling piece 21 of one end connected to the front battery packs S and a coupling piece 22 of the other end connected to the rear battery packs S. The coupling piece 21 of one end and the coupling piece 22 of the other end have a height step d with respect to each other.

Referring to FIG. 6, the bus bar B extending from the front battery packs S and the other bus bar B extending from the rear battery packs S may overlap each other at the terminal E of the one battery pack S. For example, the bus bar B extending from the front battery packs S may be disposed above and the bus bar B extending from the rear battery packs S may be disposed below. The bus bars B may reflect a height difference to allow the coupling piece 21 of one end to be formed at a relatively low position and the coupling piece 22 of the other end to be formed at a relatively high position, among the coupling pieces 21 and 22 of both ends. In other words, among a pair of the coupling pieces 20, the coupling piece 21 of one end and the coupling piece 22 of the other end may have the height step d with respect to each other.

According to the exemplary embodiment, when the plurality of battery packs S are connected together, a polarity arrangement mechanism is provided to detect a faulty polarity connection without confusing a polarity connection between the plurality of battery packs S. The polarity arrangement mechanism may immediately detect the faulty polarity connection during a process of assembling the plurality of battery packs S via the bus bars B and may correct a faulty polarity connection through a second operation. For example, the faulty polarity connection may render the bus bars B separated from the battery packs S without adhering the bus bars B onto the battery packs S during the faulty polarity connection, thereby immediately detecting a faulty job and providing a correction opportunity.

The polarity arrangement mechanism may be provided by a polarity display part 10 formed on upper surfaces of the battery packs S. The upper surfaces of the battery packs S may mean surfaces by which the terminals E of the battery packs S are exposed. The polarity display part 10 may be provided on the upper surfaces of the battery packs S to display polarities of the terminals E.

The polarity display part 10 may display a polarity of the terminal E at front and rear positions of the terminal E of each of the battery packs S. The polarity display part 10 may include a front polarity display part 11 formed at the front position of the terminal E and a rear polarity display part 12 formed at the rear position of the terminal E. The front polarity display part 11 and the rear polarity display part 12 may be formed to have different heights h1 and h2, thereby configuring the polarity arrangement mechanism.

+ terminals and − terminals having different polarities may be provided on the upper surfaces of the battery packs S. The polarity display part 10 may be formed in a periphery of each of the + terminals and the − terminals, i.e., front and rear positions of the + terminals and the − terminals, to visually display a polarity of each of the + terminals and the − terminals.

The polarity display parts 10 may be formed in both the front case C1 and the rear case C2 of the battery packs S. That is, the case C of the battery packs S may include the front case C1 and the rear case C2 in the front and rear directions in which the battery packs S are arranged. The polarity display parts 10 may be formed on each of the front case C1 and the rear case C2. The front polarity display part 11 may be formed on the front case C1. The rear polarity display part 12 may be formed on the rear case C2. The front polarity display part 11 may be integrally formed on the front case C1. The rear polarity display part 12 may be integrally formed on the rear case C2. The polarity display parts 10 may be formed in the periphery of the terminals E of the case C.

The front polarity display part 11 and the rear polarity display part 12 may be formed to have different heights h1 and h2, respectively, thereby forming the polarity arrangement mechanism.

The bus bar B may connect a pair of adjacent battery packs S. For example, when the bus bar B connects the front battery packs S and the rear battery packs S together, a path of the bus bar B may cross the front polarity display part 11 formed to have the relatively low height h1 and may detour the rear polarity display part 12 formed to have the relatively high height h2. For example, the bus bar B may be disposed on the front polarity display part 11 and may detour the rear polarity display part 12. In more detail, the coupling piece 22 of one end of the bus bar B may be disposed on the front polarity display part 11 and the coupling piece 25 of the bus bar B may detour the rear polarity display part 12. As shown in FIG. 4, the coupling piece 25 of the bus bar B may be formed at a position offset in left and right directions from the coupling pieces 20 of both ends by connecting the coupling pieces 20 of both ends. Accordingly, the connection piece 25 may connect the coupling pieces 20 coupled to the front and rear battery packs S and connect the coupling pieces 20 of both ends along a path detouring from the positions of the coupling pieces 20.

Referring to FIGS. 7 and 8, adjacent first and second battery packs S1 and S2 arranged in the front and rear directions may be connected to each other in parallel. For example, the adjacent first and second battery packs S1 and S2 may be arranged in the front and rear directions in the same orientation and the adjacent first and second battery packs S1 and S2 of the same polarity may be connected to each other in parallel. In this regard, arranging of the adjacent first and second battery packs S1 and S2 in the front and rear directions in the same orientation means that if the front case C1 and the rear case C2 of the battery pack S1 are respectively arranged in the front and rear directions, the front case C1 and the rear case C2 of the battery pack S2 also are respectively arranged in the front and rear directions.

In more detail, the + terminals E of the same polarity may be connected, and the − terminals E of the same polarity may be connected in the adjacent first and second battery packs S1 and S2 so that the adjacent first and second battery packs S1 and S2 may be connected to each other in parallel. In such a correct polarity connection, the bus bar B may not cause interference with the polarity display part 10 and may be assembled on the adjacent first and second battery packs S1 and S2 in close contact with each other. In such a parallel connection, the adjacent first and second battery packs S1 and S2 may be arranged in the front and rear directions in the same orientation.

If there is a fault in an orientation of a third battery pack S3 in the parallel connection of the first, second, and third battery packs S1, S2, and S3 arranged in the front and rear directions, the bus bar B connecting the third battery pack S3 causes physical interference with the polarity display part 10, and thus the bus bar B may not be in close contact with an upper surface of the third battery pack S3 and may be separated from the third battery pack S3. For example, the adjacent first and second battery packs S1 and S2 have the same orientation in an arrangement direction, i.e. in the front and rear directions, whereas the third battery pack S3 has a faulty orientation reversed in the front and rear directions. For example, the front case C1 and the rear case C2 of the third battery pack S3 may be respectively disposed in a rear side and in a front side so that the third battery pack S3 may be disposed in a different direction from a direction in which the first and second battery packs S1 and S2 are disposed. In this case, a + terminal and a − terminal of the third battery pack S3 are connected to a − terminal and a + terminal of the adjacent second battery pack S2, and thus the third battery pack S3 may not form the parallel connection and form a faulty polarity connection.

For example, in the polarity arrangement mechanism according to an exemplary embodiment, the front polarity display part 11 and the rear polarity display part 12 may be formed to have different heights. For example, the height h2 of the rear polarity display part 12 may be higher than the height h1 of the front polarity display part 11. As shown in a correct polarity connection A2 of FIG. 8, the bus bar B does not cause interference with the rear polarity display part 12 formed to have a relatively high height, and thus the bus bar B may be in close contact with the upper surface of the second battery pack S2 and may be assembled without being separated from the upper surface of the second battery pack S2.

However, as show in a faulty polarity connection A3 of FIG. 8, the bus bar B causes interference with the rear polarity display part 12 formed to have the relatively high height, and thus the bus bar B may not be in close contact with the upper surface of the third battery pack S3 and may be separated from the upper surface of the third battery pack S3.

Referring to A2 of FIG. 8, the bus bar B may connect the pair of adjacent first and second battery packs S1 and S2. For example, a path of the bus bar B may detour the rear polarity display part 12 formed to have the relatively high height among the front first battery pack S1 and may cross the front polarity display part 11 formed to have the relatively low height among the rear second battery pack S2. For example, the coupling piece 22 of one end of the bus bar B may be disposed on the front polarity display part 11 and the coupling piece 25 of the bus bar B may detour the rear polarity display part 12.

Referring to A3 of FIG. 8, when the rear polarity display part 12 is relatively higher than the front polarity display part 11, the bus bar B connecting the third battery pack S3 having a faulty orientation in the front and rear directions may be engaged into the rear polarity display part 12 formed to have the relatively high height and thus the bus bar B may be separated from the upper surface of the third battery pack S3. In other words, in the first and second battery packs S1 and S2 having faulty orientation in the front and rear directions, the bus bar B may detour the rear polarity display part 12 formed to have the relatively high height and cross the front polarity display part 11 formed to have the relatively low height, whereas, in the third battery pack S3 having the faulty orientation in the front and rear directions, the bus bar B (in more detail, the coupling pieces 22 of the bus bar B) may be disposed across the rear polarity display part 12 formed to have the relatively high height, and thus the bus bar B may be separated from the upper surface of the third battery pack S3 and may not be in close contact with the upper surface of the third battery pack S3.

As shown in FIG. 8, in the first and second battery packs S1 and S2 having faulty orientation in the front and rear directions, the bus bar B (in more detail, the coupling pieces 22 of the bus bar B) may extend across the front polarity display part 11 formed to have the relatively low height, whereas, in the third battery pack S3 having the faulty orientation in the front and rear directions, i.e. in the third battery pack S3 reversed in the front and rear directions, the bus bar B (in more detail, the coupling pieces 22 of the bus bar B) may extend across the rear polarity display part 12 formed to have the relatively high height, and thus the bus bar B may be separated from the upper surface of the third battery pack S3.

In the present specification, a structure in which the plurality of battery packs S are connected to each other in parallel in the front and rear directions but the exemplary embodiment is not limited thereto. For example, even when the plurality of battery packs S are in serial connected to each other in the front and rear directions, in the battery pack S having the faulty orientation in the front and rear directions, the bus bar B may cause physical interference with the front or rear polarity display part 11 or 12 formed to have a relatively high height, and thus the bus bar B may be separated from the upper surface of the battery pack S.

Referring to FIG. 3, guides G11, G12, and G2 for the bus bar B are formed on an upper surface of the battery pack S. For example, the guides G11, G12, and G2 are formed around the terminals E of the battery pack S. The guides G11, G12, and G2 may be integrally formed on the upper surface of the battery pack S, that is, on the case C of the battery pack S. The guides G11, G12, and G2 may protrude from the case C, and may arrange an assembly position of the bus bar B.

For example, the guides G11, G12, and G2 may include the first guides G11 and G12 extending in the front and rear directions. The first guides G11 and G12 may guide the bus bar B extending in the front and rear directions to connect the adjacent battery packs S. For example, when the terminal E includes a pair of a + terminal and a − terminal having different polarities, the first guides G11 and G12 may be formed in an inner position between the pair of the + terminal and the − terminal and an outer position. That is, the first guides G11 and G12 may include a pair of inner first guides G11 formed in the inner position between the + terminal and the − terminal and additionally a pair of outer first guides G12 formed in the outer position beyond the + terminal and the − terminal.

In addition to the first guides G11 and G12 extending in the front and rear directions, the guides G11, G12, and G2 may include the second guide G2 extending in a different direction from the front and rear directions, for example, in a left and right directions perpendicular to the front and rear directions. The second guide G2 may arrange assembly positions of the bus bars B extending in a bent pattern in the periphery of the terminals E or between the + terminal and the − terminal. As a whole, the guides G11, G12, and G2 may include the first and second guides G11, G12, and G2 extending in different directions, and the bus bars B may be guided by the first and second guides G11, G12, and G2 and extend in the bent pattern.

The guides G11, G12, and G2 may integrally protrude from an upper surface of the case C. That is, the polarity display parts 10 and the guides G11, G12, and G2 may be integrally formed on the upper surface of the case C. The case c may include the front case C1 and the rear case C2 that are assembled to face each other. The guides G11, G12, and G2 may be formed in the front case C1 and the rear case C2.

Although not shown, a battery module according to an embodiment may further include a master pack M for controlling recharging and discharging operations of a plurality of battery packs S. The master pack M is electrically connected to the battery packs S and thus disposed in recharging and discharging routes. As described above, the battery packs S may have substantially the same structure. Accordingly, various required performances may all be satisfied using the battery packs S having the same structure by using the battery packs S having substantially the same structure and connecting the battery packs S, the number of which is increased or decreased according to required output performance, to each other.

The master pack M may have substantially the same external size as the battery pack S, which is for making an external shape of the entire battery module including the master pack M and the battery pack S more compact. That is, the master pack M and the battery pack S may be connected in various structures, and when external sizes of the master pack M and the battery pack S are substantially the same, dead volume may be reduced in the entire battery module, and thus, the external shape of the entire battery module may become compact.

While one or more exemplary embodiments have been described with reference to the figures, it will be understood by those of ordinary skill in the art that various changes in form and details may be made therein without departing from the spirit and scope as defined by the following claims.

What is claimed is:

1. A battery module comprising:
   a bus bar; and
   a plurality of battery packs electrically connected to each other by the bus bar and arranged in front and rear directions,
   wherein each of the plurality of battery packs comprises a + terminal and a − terminal of different polarities and comprises a front polarity display part and a rear polarity display part that each display polarities of each terminal, the front polarity display part and the rear polarity display part respectively formed in front and rear of the + terminal and − terminal,
   wherein the front polarity display part and the rear polarity display part are formed to have different heights.

2. The battery module of claim 1, wherein the plurality of battery packs comprise a front case and a rear case that are coupled to face each other,
   wherein the front polarity display part is integrally formed on the front case, and
   wherein the rear polarity display part is integrally formed on the rear case.

3. The battery module of claim 1, wherein the bus bar connects a front battery pack and a rear battery pack together, detours the rear polarity display part of the front battery pack, and crosses the front polarity display part of the rear battery pack.

4. The battery module of claim 1, wherein a height of the rear polarity display part is greater than that of the front polarity display part.

5. The battery module of claim 1, wherein the bus bar comprises:
   a pair of coupling pieces coupled to terminals of different battery packs arranged in the front and rear directions; and
   a connection piece formed between the pair of coupling pieces.

6. The battery module of claim 5, wherein among the pair of coupling pieces, a coupling piece of one end and a coupling piece of the other end are formed to have different heights.

7. The battery module of claim 5,
   wherein the coupling pieces are laid flat with respect to an upper surface of the battery pack, and
   the connection piece stands upright vertically with respect to the upper surface of the battery pack.

8. The battery module of claim 1, wherein the plurality of battery packs are arranged in the front and rear directions in the same orientation and same polarities of the plurality of battery packs are connected to each other in parallel.

9. The battery module of claim 1, wherein the plurality of battery packs comprise a front case and a rear case that are coupled to face each other,
   wherein guides for guiding an assembly position of the bus bar are formed in a terminal periphery of the front case and the rear case.

10. The battery module of claim 9, wherein the guides are integrally formed on the front case and the rear case.

11. The battery module of claim 9, wherein the guides are formed in front and rear directions or left and right directions perpendicular to the front and rear directions.

12. The battery module of claim 9, wherein the bus bar is guided by the guides and connects adjacent battery packs along a bent pattern.

13. The battery module of claim 1, wherein the bus bar comprises two terminal holes at different heights.

* * * * *